(12) United States Patent
Martin et al.

(10) Patent No.: US 11,269,792 B2
(45) Date of Patent: Mar. 8, 2022

(54) DYNAMIC BANDWIDTH MANAGEMENT ON A STORAGE SYSTEM

(71) Applicant: EMC IP Holding Company LLC, Hopkinton, MA (US)

(72) Inventors: Owen Martin, Hopedale, MA (US); Erik P. Smith, Douglas, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/887,344

(22) Filed: May 29, 2020

(65) Prior Publication Data
US 2021/0374078 A1    Dec. 2, 2021

(51) Int. Cl.
G06F 13/16     (2006.01)
G06F 11/34     (2006.01)

(52) U.S. Cl.
CPC ...... G06F 13/1668 (2013.01); G06F 11/3442 (2013.01); G06F 2213/0062 (2013.01)

(58) Field of Classification Search
None
See application file for complete search history.

(56) References Cited

U.S. PATENT DOCUMENTS

| | | | | |
|---|---|---|---|---|
| 8,612,330 | B1 * | 12/2013 | Certain | G06F 9/50 705/37 |
| 10,671,302 | B1 * | 6/2020 | Aggarwal | G06F 3/0659 |
| 2006/0120282 | A1 * | 6/2006 | Carlson | H04L 47/805 370/229 |
| 2008/0049753 | A1 * | 2/2008 | Heinze | H04L 47/726 370/392 |
| 2009/0144393 | A1 * | 6/2009 | Kudo | G06F 9/5044 709/218 |
| 2011/0270913 | A1 * | 11/2011 | Jarnikov | H04N 21/2402 709/203 |
| 2014/0180862 | A1 * | 6/2014 | Certain | G06Q 30/08 705/26.3 |
| 2018/0113640 | A1 * | 4/2018 | Fernandez | G06F 3/061 |

FOREIGN PATENT DOCUMENTS

EP          3371699 A1 *  9/2018    .......... G06F 11/3442

OTHER PUBLICATIONS

U.S. Appl. No. 16/374,182, filed Apr. 3, 2019, Rowlands, et al.

* cited by examiner

Primary Examiner — Michael Sun
(74) Attorney, Agent, or Firm — Muirhead and Saturnelli, LLC

(57) ABSTRACT

Bandwidth on a front-end port of a storage system may be managed. A plurality of logical storage units may be divided into a plurality of priority groups according to a predefined priority. For a first priority group of the plurality of priority groups having a highest priority, a first forecasted average amount of bandwidth of the first port to be consumed by the logical storage units of the first priority group during a first temporal interval may be determined. Based on the first forecasted average amount, a first reserve amount of bandwidth on the first port to be reserved for use by the logical storage units of the first priority group during the first temporal interval may be determined. The first reserve amount of bandwidth on the first port for use by the logical storage units of the first priority group during the first temporal interval may be reserved.

20 Claims, 11 Drawing Sheets

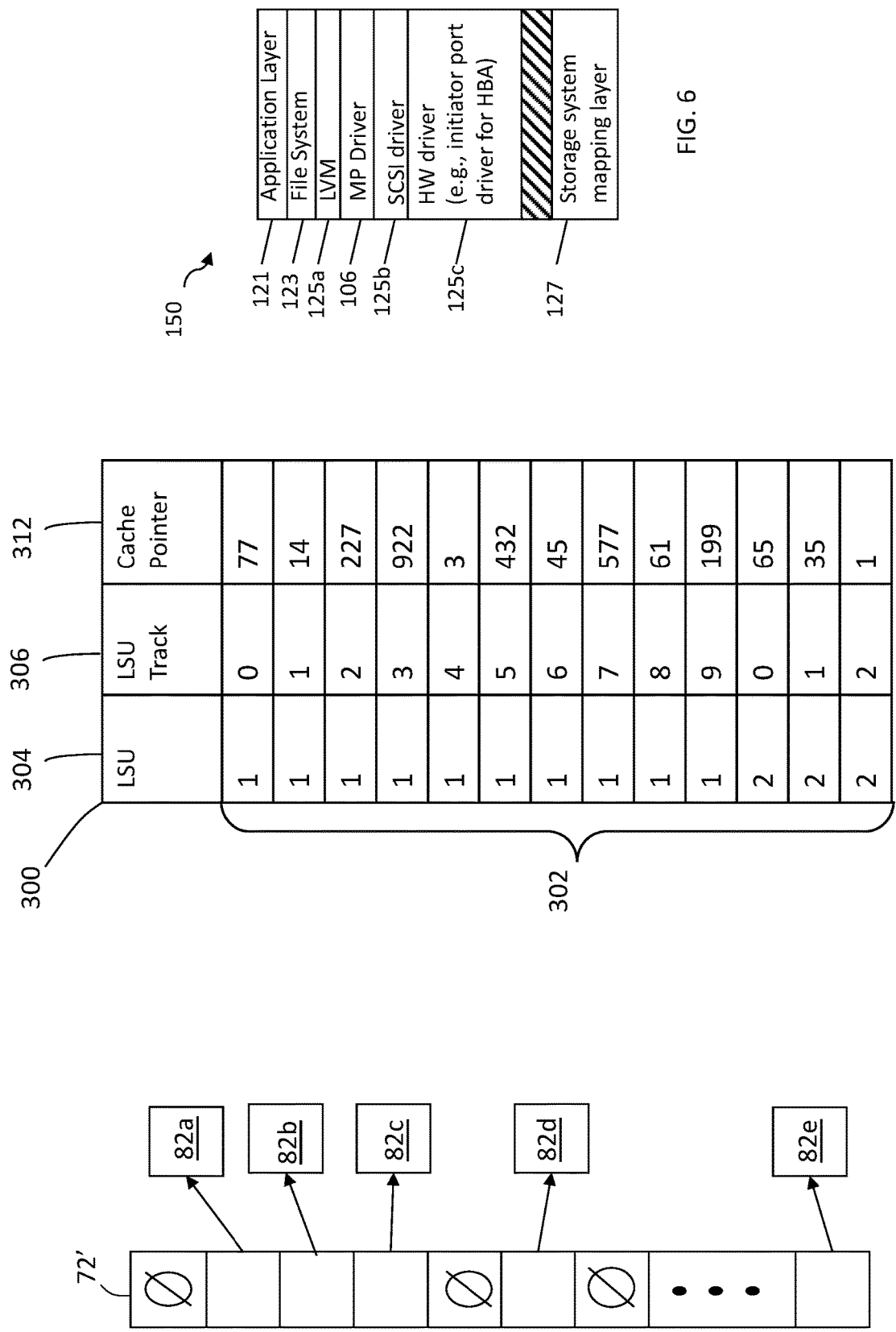

FIG. 8 — Table 800

| LSU | Host Port (804) | Front-End Port (806) | Other Info (808) |
|---|---|---|---|
| Dev0 | WWN12 | WWN45 | |
| Dev1 | WWN9 | WWN117 | |
| ... | | | |
| Devn | WWN77 | WWN6 | |

(802, 810)

FIG. 9 — Table 900

| Initiator Port (902) | Target Port (904) | Other Info (906) |
|---|---|---|
| WWW1 | WWW3 | |
| WWW7 | WWW8 | |
| ... | | |
| WWW9 | WWW2 | |

(910)

FIG. 10 — Table 1000

| Connection (1002) | SG (1004) | PG (1006) | BWT (1008) | BW Consumed (1009) |
|---|---|---|---|---|
| 1 | | | | |
| 2 | | | | |
| ... | | | | |
| n | | | | |

(1010)

| Forecast Interval 1202 | PG1 Cum. Avg. Consumed BW 1204 | PG2 Cum. Avg. Consumed BW 1206 | . . . | PGn Cum. Avg. Consumed BW 1208 | Other Info |
|---|---|---|---|---|---|
| 1 | | | | | |
| 2 | | | | | |
| ... | | | | | |
| n | | | | | |

1210

| FEP ID 1304 | | | FEP BWT 1306 | | | Other Info |
|---|---|---|---|---|---|---|
| Forecast Interval 1312 | PG1 Reserved BW 1314 | PG2 Reserved BW 1316 | . . . | PGn Reserved BW 1318 | Remaining BW 1320 | Other info |
| 1 | | | | | | |
| 2 | | | | | | |
| ... | | | | | | |
| n | | | | | | |

1302

1310

DYNAMIC BANDWIDTH MANAGEMENT ON A STORAGE SYSTEM

BACKGROUND

Technical Field

This application generally relates to data storage systems, and more particularly to managing bandwidth limits on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host systems view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method may be performed for a storage system including a first port communicatively coupled to one or more host ports, and including a plurality of logical storage units for which IO connections have been established between the first port and the one or more host ports. The method includes dividing the plurality of logical storage units into a plurality of priority groups, the priority groups ordered according to a predefined priority, for a first priority group of the plurality of priority groups having a highest priority, determining a first forecasted cumulative average amount of bandwidth of the first port to be consumed by the logical storage units of the first priority group during a first temporal interval, based on the first forecasted average amount, determining a first reserve amount of bandwidth on the first port to be reserved for use by the logical storage units of the first priority group during the first temporal interval, and reserving the first reserve amount of bandwidth on the first port for use by the logical storage units of the first priority group during the first temporal interval. The first port may have a first bandwidth threshold defining a maximum amount of bandwidth permitted to be consumed during any time interval on the first port, and the method further may include determining a first remaining amount of bandwidth available for use on the first port during the first temporal interval by subtracting the first reserved amount of bandwidth from the first bandwidth threshold. The method may include determining a second bandwidth threshold defining a maximum amount of bandwidth permitted to be consumed for an IO path between the first port and a first of the one or more host ports, and for a first IO connection between the first port and the first host port for a logical storage unit that is not a member of the first priority group, determining a first amount of bandwidth to allocate to the first IO connection based on at least the second bandwidth threshold and the first remaining amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first remaining amount of bandwidth, adjusting an amount of bandwidth to be consumed by one or more IO connections on the first port during the first temporal interval. The method may include determining a second bandwidth threshold defining a maximum amount of bandwidth permitted to be consumed for an IO path between the first port and a first of the one or more host ports, and, for a first IO connection between the first port and the first host port for a logical storage unit that is a member of the first priority group, determining a first amount of bandwidth to allocate to the first IO connection based on at least the second bandwidth threshold and the first reserve amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first reserve amount, adjusting an amount of bandwidth to be consumed by the first IO connection during the first temporal interval. The method further may include, for a second priority group of the plurality of priority groups having a priority lower than the first priority group, determining a second forecasted average amount of bandwidth of the first port to be consumed by the logical storage units of the second priority group during the first temporal interval, based on the second forecasted average amount, determining a second reserve amount of bandwidth on the first port to be reserved from the first remaining amount of bandwidth for use by the logical storage units of the second priority group during the first temporal interval, and reserving the second reserve amount of bandwidth on the first port for use by the logical storage units of the second priority group during the first temporal interval.

In another embodiment of the invention, the storage system may include a first port communicatively coupled to one or more host ports, a plurality of logical storage units for which IO connections have been established between the first port and the one or more host ports, and executable logic that implements a method. The method includes dividing the plurality of logical storage units into a plurality of priority groups, the priority groups ordered according to a predefined priority, for a first priority group of the plurality of priority groups having a highest priority, determining a first forecasted cumulative average amount of bandwidth of the first port to be consumed by the logical storage units of the first priority group during a first temporal interval, based on the first forecasted average amount, determining a first reserve amount of bandwidth on the first port to be reserved for use by the logical storage units of the first priority group during the first temporal interval, and reserving the first reserve amount of bandwidth on the first port for use by the logical storage units of the first priority group during the first temporal interval. The first port may have a first bandwidth threshold defining a maximum amount of bandwidth permitted to be consumed during any time interval on the first port, and the method further may include determining a first remaining amount of bandwidth available for use on the first port during the first temporal interval by subtracting the first reserved amount of bandwidth from the first bandwidth threshold. The method further may include determining a second bandwidth threshold defining a maximum amount of bandwidth permitted to be consumed for an IO path between the first port and a first of the one or more host ports, and, for a first IO connection between the first port and the first host port for a logical storage unit that is not a member of the first priority group, determining a first amount of bandwidth to allocate to the first IO connection based on at least the second bandwidth threshold and the first remaining amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first remaining amount of bandwidth, adjusting an amount of bandwidth to be consumed by one or more IO connections on the first port during the first temporal interval. The method further may include determining a second bandwidth threshold defining a maximum amount of bandwidth permitted to be consumed for an IO path between the first port and a first of the one or more host ports, and, for a first IO connection between the first port and the first host port for a logical storage unit that is a member of the first priority group, determining a first amount of bandwidth to allocate to the first IO connection based on at least the second bandwidth threshold and the first reserve amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first reserve amount, adjusting an amount of bandwidth to be consumed by the first IO connection during the first temporal interval. The method further may include, for a second priority group of the plurality of priority groups having a priority lower than the first priority group, determining a second forecasted average amount of bandwidth of the first port to be consumed by the logical storage units of the second priority group during the first temporal interval, based on the second forecasted average amount, determining a second reserve amount of bandwidth on the first port to be reserved from the first remaining amount of bandwidth for use by the logical storage units of the second priority group during the first temporal interval, and reserving the second reserve amount of bandwidth on the first port for use by the logical storage units of the second priority group during the first temporal interval.

In another embodiment of the invention, computer-readable media is provided for a storage system including a first port communicatively coupled to one or more host ports, and including a plurality of logical storage units for which IO connections have been established between the first port and the one or more host ports. The computer-readable media has software stored thereon including executable code that divides the plurality of logical storage units into a plurality of priority groups, the priority groups ordered according to a predefined priority, executable code that, for a first priority group of the plurality of priority groups having a highest priority, determines a first forecasted cumulative average amount of bandwidth of the first port to be consumed by the logical storage units of the first priority group during a first temporal interval, executable code that, based on the first forecasted average amount, determines a first reserve amount of bandwidth on the first port to be reserved for use by the logical storage units of the first priority group during the first temporal interval, and executable code that reserves the first reserve amount of bandwidth on the first port for use by the logical storage units of the first priority group during the first temporal interval. The first port may have a first bandwidth threshold defining a maximum amount of bandwidth permitted to be consumed during any time interval on the first port, and the software further may include executable code that determines a first remaining amount of bandwidth available for use on the first port during the first temporal interval by subtracting the first reserved amount of bandwidth from the first bandwidth threshold. The software further may include executable code that determines a second bandwidth threshold defining a maximum amount of bandwidth permitted to be consumed for an IO path between the first port and a first of the one or more host ports, and executable code that, for a first IO connection between the first port and the first host port for a logical storage unit that is not a member of the first priority group, determines a first amount of bandwidth to allocate to the first IO connection based on at least the second bandwidth threshold and the first remaining amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first remaining amount of bandwidth, adjusting an amount of bandwidth to be consumed by one or more IO connections on the first port during the first temporal interval. The software further may include executable code that determines a second bandwidth threshold defining a maximum amount of bandwidth permitted to be consumed for an IO path between the first port and a first of the one or more host ports, and executable code that, for a first IO connection between the first port and the first host port for a logical storage unit that is a member of the first priority group, determines a first amount of bandwidth to allocate to the first IO connection based on at least the second bandwidth threshold and the first reserve amount of bandwidth. Determining the first amount of bandwidth to allocate to the first IO connection may include determining a second amount of bandwidth desired to be consumed by the first IO connection during the first temporal interval, and, if the second amount of bandwidth exceeds the second bandwidth threshold or the first reserve amount, adjusting an amount of bandwidth to be consumed by the first IO connection during the first temporal interval.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an IO request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 10 is a block diagram illustrating an example of a data structure for managing bandwidth of IO connections of a front-end port, according to embodiments of the invention;

DETAILED DESCRIPTION OF EMBODIMENTS

Figure 1:
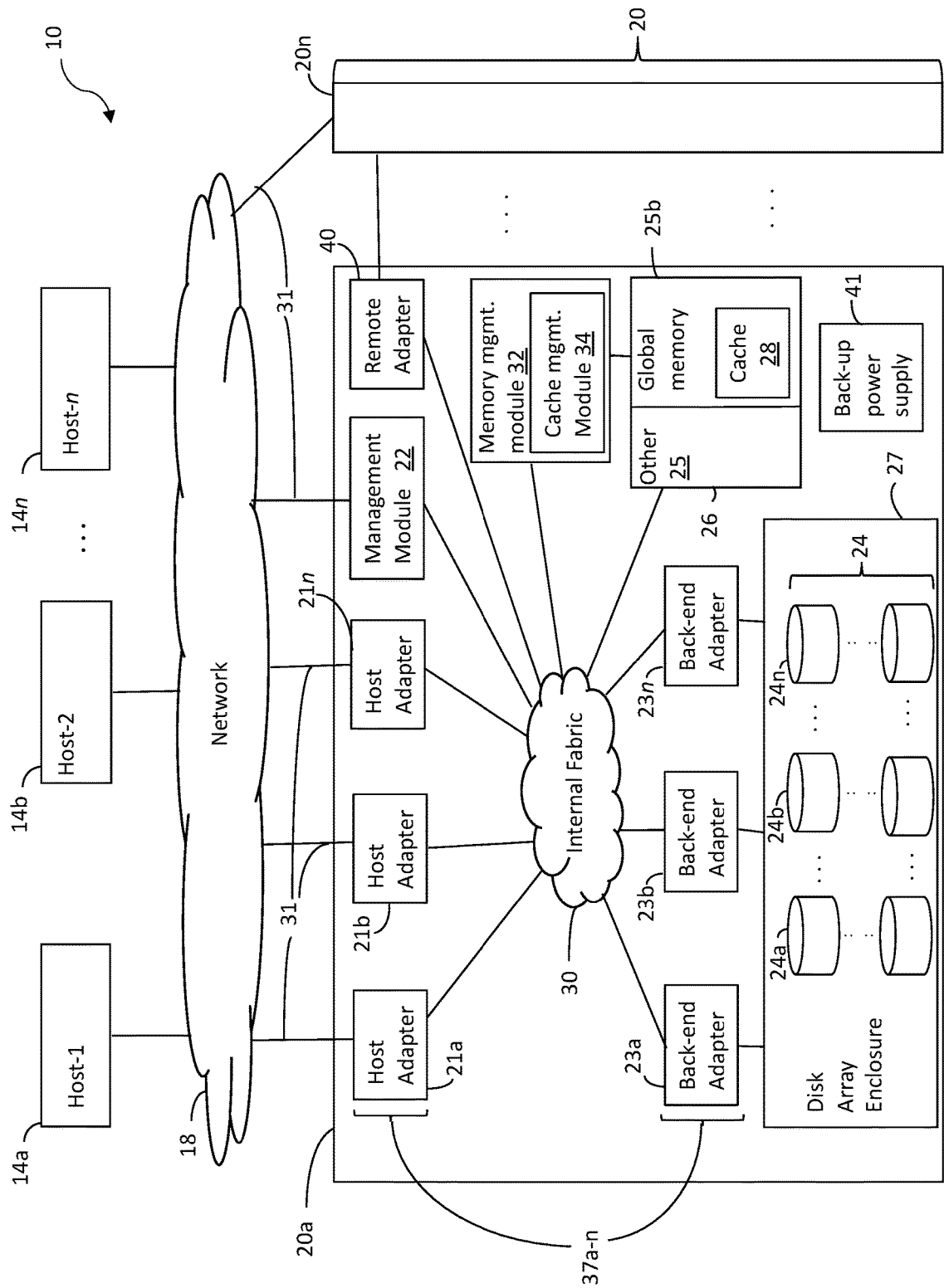
FIG. 1 is a block diagram illustrating an example of a data storage network, according to embodiments of the invention.

IO connections may be defined for applications executing on host systems, over IO paths, to physical storage devices on a storage system. These IO connections may include front-end ports (FEPs) of the storage system, host ports and network components therebetween, including one or more switches, as described in more detail elsewhere herein. IO communications for IO connections consume bandwidth, and maximum bandwidth thresholds may be defined for IO connections, where a maximum bandwidth defines a maximum amount of bandwidth (i.e., bits per unit time) permitted to be consumed. A maximum bandwidth threshold may be referred to herein as simply "bandwidth threshold" or "BWT".

Multiple IO connections may include (and thus use) an FEP. In some cases, cumulative BWTs of these IO connections exceeds the maximum bandwidth capacity of the FEP, in which case the FEP may be referred to as being oversubscribed. When an FEP is oversubscribed, applications, in particular high-priority applications, may not be allocated enough bandwidth on the FEP to satisfy performance objectives defined for the applications.

What may be desirable is a way to provide adequate bandwidth to satisfy performance objectives of an application, in particular a high-priority application, on an FEP that is oversubscribed.

Described herein are techniques and mechanisms for managing bandwidth on an FEP, e.g., an oversubscribed FEP, to help satisfy performance objectives of an application.

A plurality of IO connections including an FEP of a storage system may be defined for host applications (i.e., applications executing on one or more host systems) and may associate the host applications with LSUs of the storage system. The LSUs may be divided into a plurality of priority groups that are ordered—i.e., highest to lowest—according to a pre-defined priority. These priority groups may correspond to performance objectives defined for LSUs, for example, in accordance with service level objectives defined for the LSUs. For example, service level objectives may be associated with predefined groups of LSUs referred to herein as "storage groups" or SGs that may be associated with host applications. Priority groups may be defined to correspond to these SGs, and thus correspond to the service level objectives defined therefor.

In some embodiments of the invention, workload forecasting may be performed for a highest priority group. The workload forecasting may include determining the cumulative average amount of bandwidth to be consumed on the FEP by LSUs (and thus the applications associated therewith) of the highest priority group for one or more future temporal intervals. For each future temporal interval, an amount of bandwidth to reserve for the highest priority group may be determined based on the corresponding determined cumulative average amount of bandwidth consumption. From the bandwidth capacity of the FEP, the determined amount of bandwidth to reserve may be reserved for the first priority group for the respective temporal interval. The amount of bandwidth remaining for the FEP (i.e., after subtracting the reserved amount from the bandwidth capacity of the FEP) may be shared, and competed for, by the IO connections using the FEP, including LSUs of the highest priority group. That is, while a certain amount of bandwidth of the FEP may be reserved for IO connections of LSU of the highest priority group, such IO connections still may compete for use of remaining bandwidth with other IO connections.

In some embodiments, there are two or more priority groups, in which case determining the cumulative average, determining a reserve amount and reserving the reserve amount as described above for the highest priority group may be performed for the priority groups, for example in order of priority—i.e., highest to lowest.

In some embodiments, for one or more IO paths between an FEP and a host port, a BWT may be determined for the IO path, and the amount of bandwidth consumed by an IO connection on the IO path may be further limited based on this BWT as described in more detail elsewhere herein.

By reserving bandwidth for priority groups on an FEP, priority applications corresponding to the priority groups may experience better performance (e.g., response times) even during periods of increased traffic and latency if the FEP is oversubscribed. By further limiting bandwidth consumption of IO connections based on BWTs established for IO paths, IO traffic and latency may be further reduced, and performance further improved.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (TO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
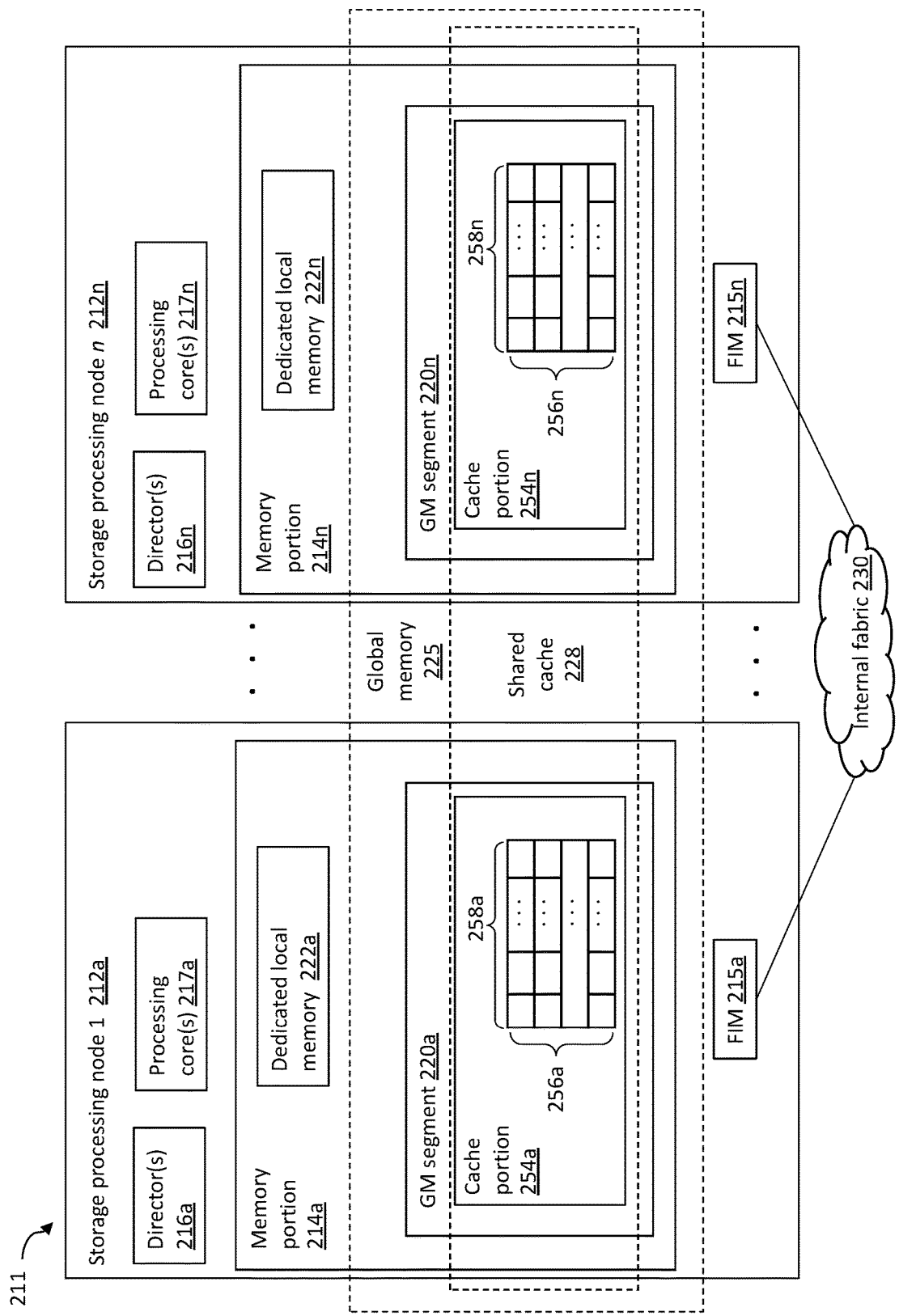
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VIVIAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
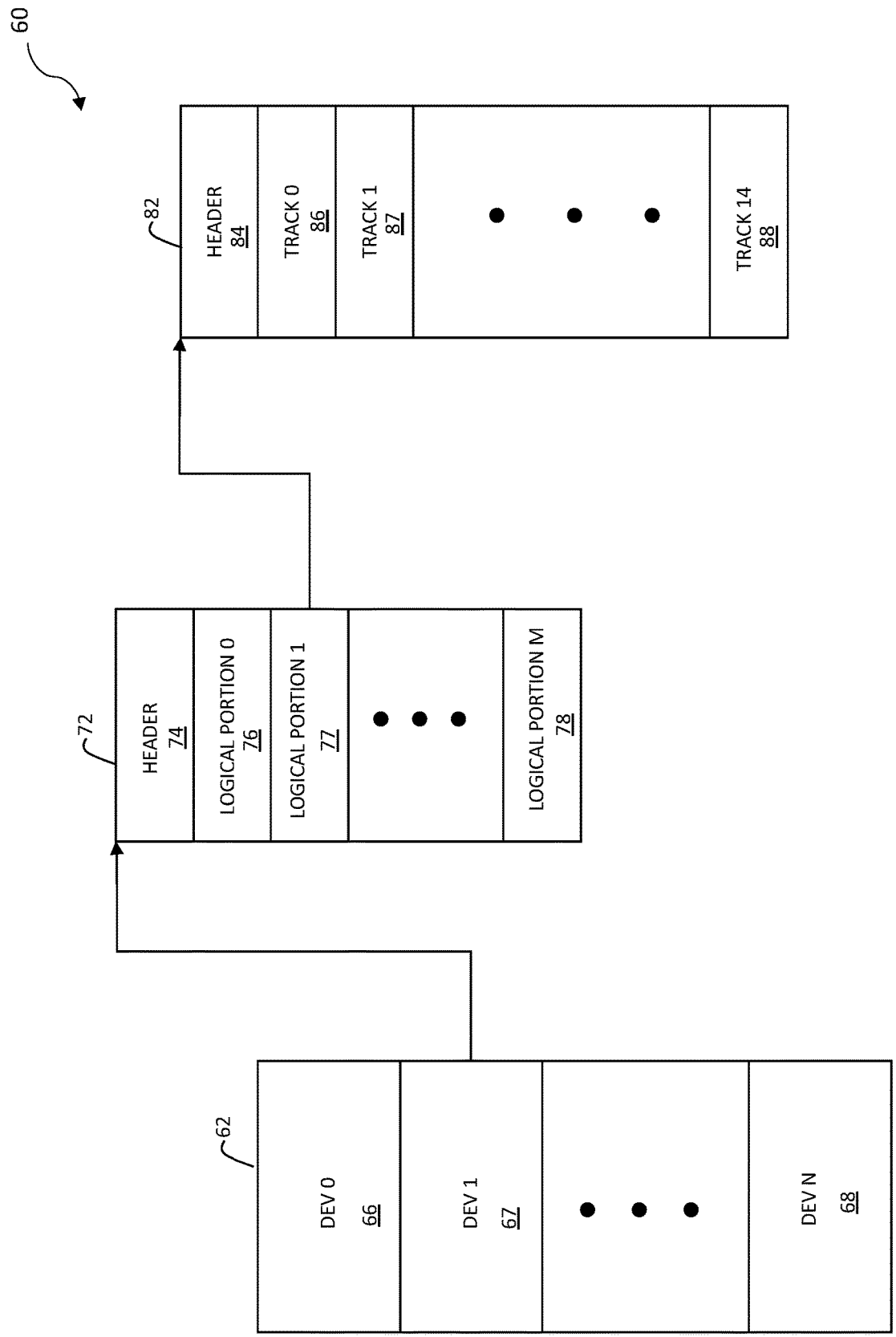
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

Figure 5:
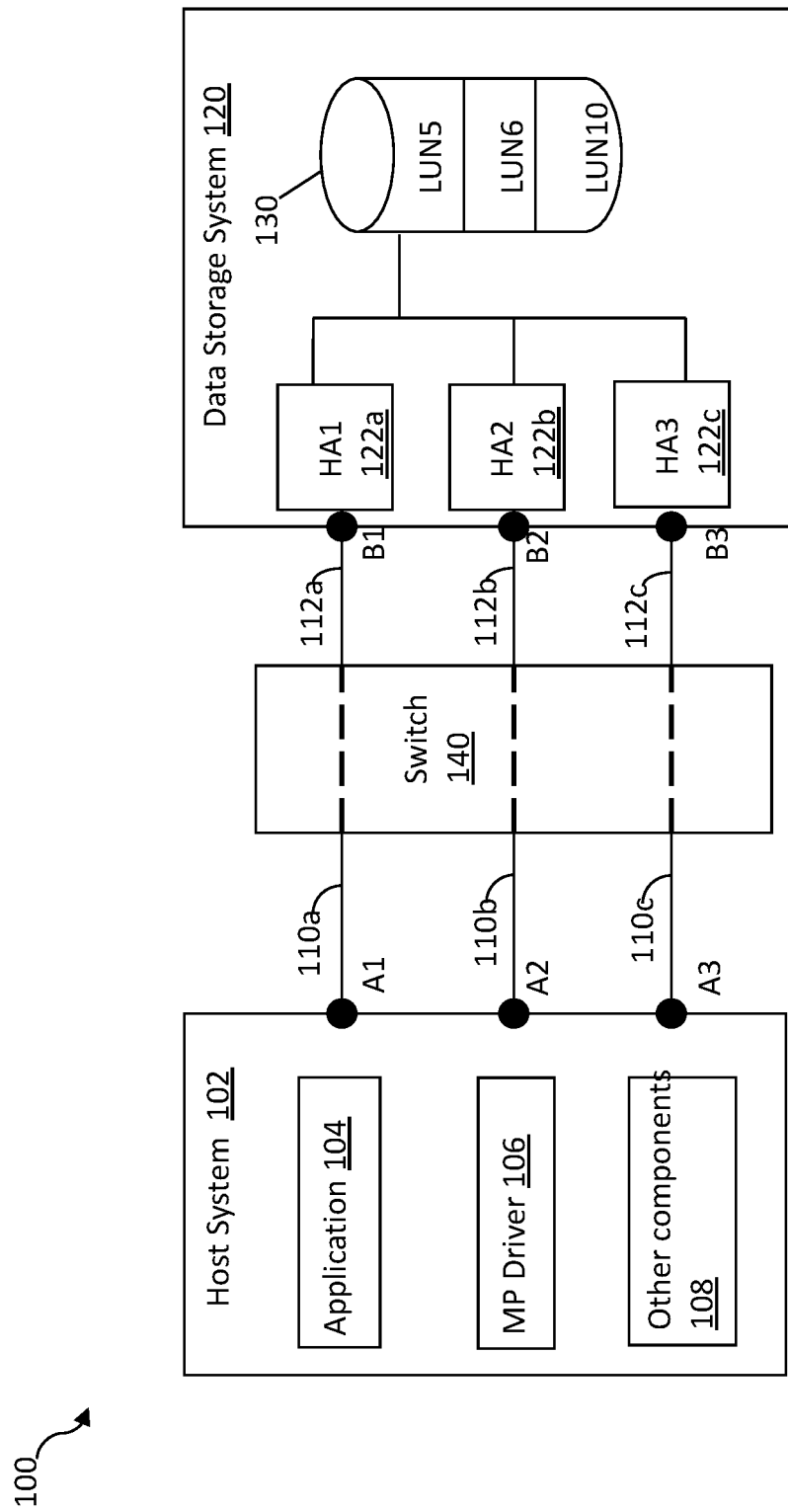
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple IO paths, according to embodiments of the invention. Other embodiments of system including a host system communicatively coupled to a data storage system via multiple IO paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more IO paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An IO request (specifying an IO operation) from the application 104 may be communicated to the data storage system 120 using the MP driver 106 and one or more other components 108. The application 104 may be a database or other application which issues data operations, such as JO operations, to the data storage system 120. Each of the JO operations may be directed to a target device, such as one of the LSUs of physical storage device 130, configured to be accessible to the host system 102 over multiple JO paths. As such, each of the JO operations may be forwarded from the application 104 to the data storage system 120 over one of the possible multiple JO paths.

The MP driver 106 may include functionality to perform any one or more different types of processing such as related to encryption, multi-pathing, mirroring, migration, and the like. For example, the MP driver 106 may include multi-pathing functionality for management and use of multiple JO paths. For example, the MP driver 106 may perform JO path selection to select one of the possible multiple JO paths based on one or more criteria such as load balancing to distribute JO requests for the target device across available active JO paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the JO operation from the host system to the data storage system 120 such as, for example, Fibre Channel (FC) or SCSI drivers, a logical volume manager (LVM), or the like. The other components 108 may include software or other components used when sending an IO operation from the application 104 to the data storage system 120, where such components may include those invoked in a call stack above and/or below the MP driver 106. For example, application 104 may issue an IO operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more JO paths. For example, all LSUs of physical storage device 130 may be accessible using ports of the three FEs 122a-122c, also denoted respectively as host adapters HA1, HA2 and HA3. The multiple IO paths allow the application IOs to be routed over multiple IO paths and, more generally, allow the LSUs of physical storage device 130 to be accessed over multiple IO paths. In the event that there is a component failure in one of the multiple IO paths, IO requests from applications can be routed over other alternate IO paths unaffected by the component failure. The MP driver 106 may be configured to perform load balancing in connection with IO path selection, as well as other processing. The MP driver 106 may be aware of, and may monitor, all IO paths between the host system and the LSUs of the physical storage device 130 in order to determine which of the multiple IO paths are active or available at a point in time, which of the multiple IO paths are unavailable for communications, and to use such information to select an IO path for host system-data storage system communications.

In the example of the system 100, each of the LSUs of the physical storage device 130 may be configured to be accessible through three IO paths. Each IO path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three IO paths—a first IO path represented by A1-B1, a second IO path represented by A2-B2 and a third IO path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an IO request, according to embodiments of the invention. Other embodiments of a plurality of logical layers of a combination of a host system and a data storage system for processing an IO request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime IO stack, such as when an IO request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the IO received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple IO path management and selecting one of a plurality of possible IO paths for use in connection with processing IO operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received IO request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the IO operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more IO requests specifying IO operations (e.g., read and write operations) to logical volumes (implemented by the LVM 125a) or files (implemented using the file system 123), whereby such IO requests may be mapped to IO communications (specifying the IO operation) directed to LSUs of the data storage system. Such IO operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to IO operations and other non-IO commands such as related to host system control operations. IO operations may include, for example, read and write operations with respect to data stored on an LSU.

In connection with the SCSI standard, an IO path may be defined between an initiator port of the host system and a target port of the data storage system. An IO request may be sent from the host system (e.g., from a component thereof such as an HBA), which may be referred to as an initiator, originator or source with respect to the foregoing IO path. The host system, as the initiator, sends IO requests along the IO path to a data storage system (e.g., a particular component thereof such as an HA having a port with a network address), which may be referred to as a target, destination, receiver, or responder. Each physical connection of an IO path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such IO path, one or more LSUs may be visible or exposed to the host system initiator through the target port of the data storage system.

Figure 7:
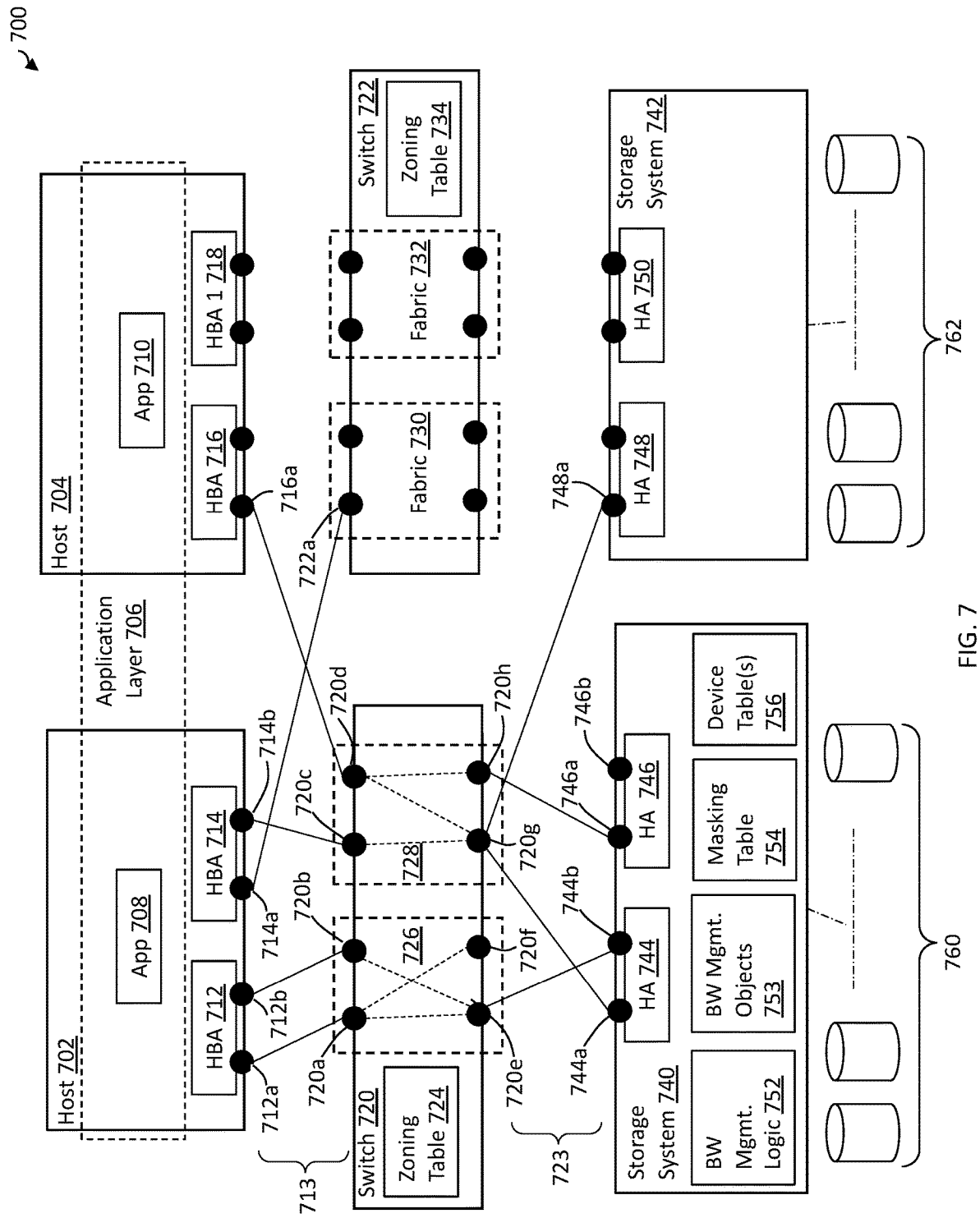
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712a, 712b, 714a and 714b. The portion of application layer 706 running on host 702 may include application 708 and one or more other applications. HBA 712 may include host ports 712a and 712b, and HBA 714 may include host ports 714a and 714b. HBAs 712 and 714 each may be separate discrete logical or physical components of host 702, and host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713. Each such physical connection may be a cable and, in some embodiments, there is only enabled one physical connection between each host port and fabric port (e.g., in accordance with a technology standard (e.g., FC)) as illustrated in FIG. 7. That is, in some embodiments, each fabric port is dedicated to one host port. FIG. 7 illustrates host ports 712a, 712b, 714a, 714b and 716a connected to fabric ports over physical connections 713 in which there is only one physical connection 713 between each host port and each fabric port.

Host 704 may include any of: a portion of the application layer at 706; application 710; HBAs 716 and 718; and multiple host ports including host port 716a of HBA 716.

Switch 720 may include any of: zoning table 724, fabrics 726 and 728; ports 720a-h; other components; or any suitable combination of the foregoing. Each of ports 720a-h ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723. Each such physical connection may be a cable and, in some embodiments, there is only enabled one physical connection between each SSP and FEP (e.g., in accordance with a technology standard (e.g., FC)) as illustrated in FIG. 7. That is, in some embodiments, each SSP is dedicated to an FEP. FIG. 7 illustrates FEPs 744a, 744b and 746a connected to SSPs 720g, 720a and 720h, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712a, 712b, 714a, 714b and 716a, are enabled to communicate with which FEPs, for example, 744a, 744b, 746a, 746b and 748a. Zoning tables are described in more detail elsewhere herein. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which IO connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

The switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

The storage system 740 may include any of: bandwidth (BW) logic 752; bandwidth (BW) management objects 753; masking table 754; device table(s) 756; HAs 744 and 746; FEPs 744a, 744b, 746a and 746b; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The BW management logic 752 may be configured with logic (software, hardware, firmware or a combination thereof) to perform one or processes in accordance with managing bandwidth for IO connections on a storage network, for example, one or more of the methods described herein, or sub-steps thereof, including methods 1100 and 1400. The BW management logic 752 may be configured to use the BW management objects 753 to manage bandwidth for IO connections on a storage network. The BW management objects 753 may include one or more objects (e.g., data structures) for managing bandwidth for IO connections on a storage network including, for example, any of data structures 800, 900, 1000, 1200, 1300, 1500 and 1600 described in more detail elsewhere herein. The BW management logic 752 or components thereof may be implemented as part of one or more FAs 21a-n and/or management module 22 described in relation to FIG. 1.

The storage system 742 may include any of the same or similar components as storage system 740, including HA 748 and FEP 748a thereof. In some embodiments, storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define IO connectivity in terms of LSUs, FEPs and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which FEPs (e.g., SCSI targets). Defining (including initially defining and later modifying) which host ports are permitted to perform IO communications with which LSUs over which FEPs, for example, using a masking table or other data structure, may be referred to as configuring or defining IO connectivity between a host port, FEP and LSU, or more simply as "masking."

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate IO over the FEP identified in column 806. Other information, for example, the host and/or the HBA associated with the host port and/or the FA associated with the FEP may be specified in column 808. A data structure other than a table, for example, a linked list and/or object-oriented data structure, may be used to record the same information.

To properly configure IO connectivity between host ports, FEPs and LSUs, it may be necessary to know the permissible IO paths between host ports and FEPs (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and FEP IDs (WWNs), each identified host port corresponding to a directly connected (e.g., by an FC cable) SHP of the switch and each identified FEP corresponding to a directly connected SSP of the switch. Thus, the zoning table defines permissible IO paths between a host system and a storage system, each IO path defined by (and including) a host port and an FEP. Such IO paths may be referred to herein as "zoned IO paths" or "enabled IO paths," and the process of defining (including initially defining and later modifying) enabled IO paths in a zoning table, or the resulting enabled IO paths collectively, may referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, for example, bandwidth management objects 753, which may include any of data structures 1000, 1200, 1300 and 1500 described in more detail elsewhere herein. It should be appreciated that one or more of the data structures 62, 72, 72', 82, 800, 900, 1000, 1200, 1300, 1500 and 1600, or information contained therein, may be combined in one or more data structures, either as a variation of the one of the foregoing data structures or in a different data structure altogether.

FIG. 10 is a block diagram illustrating an example of a data structure 1000 for managing bandwidth of IO connections of an FEP, according to embodiments of the invention. Other embodiments of a data structure for managing bandwidth of IO connections of an FEP, for example, variations of the data structure 1000, are possible and are intended to fall within the scope of the invention. The data structure 1000 may represent, for example, all IO connections for the storage system 740 that include the FEP 744b, as defined, e.g., in the data structure 800.

The data structure (e.g., table) 1000 may include a plurality of entries 1010, each entry representing an IO connection identified in a column 1002 that includes the FEP and specifying: an SG corresponding to the IO connection in a column 1004; a priority group corresponding to the IO connection in a column 1006; a BWT defined for the IO path over which the IO connection is defined in a column 1008; and bandwidth consumed or scheduled to be consumed in a temporal interval (e.g., a current temporal interval) by the IO connection in a column 1009. Other information, for example, the host, the HBA and/or the FA associated with the IO connection represented by an entry, may be specified. The IO connection identifier may include an identification of an LSU, FEP and host port, for example, like those specified in columns 802, 804 and 806 of data structure 800. In some embodiments, data structures 1000 and 800 are part of a same data structure that includes a plurality of entries, each entry representing an IO connection and including a combination of the information described for entries of data structures 1000 and 800. A data structure other than the table illustrated in FIG. 10, for example, a linked list and/or object-oriented data structure, may be used to record the same information.

Figure 11:
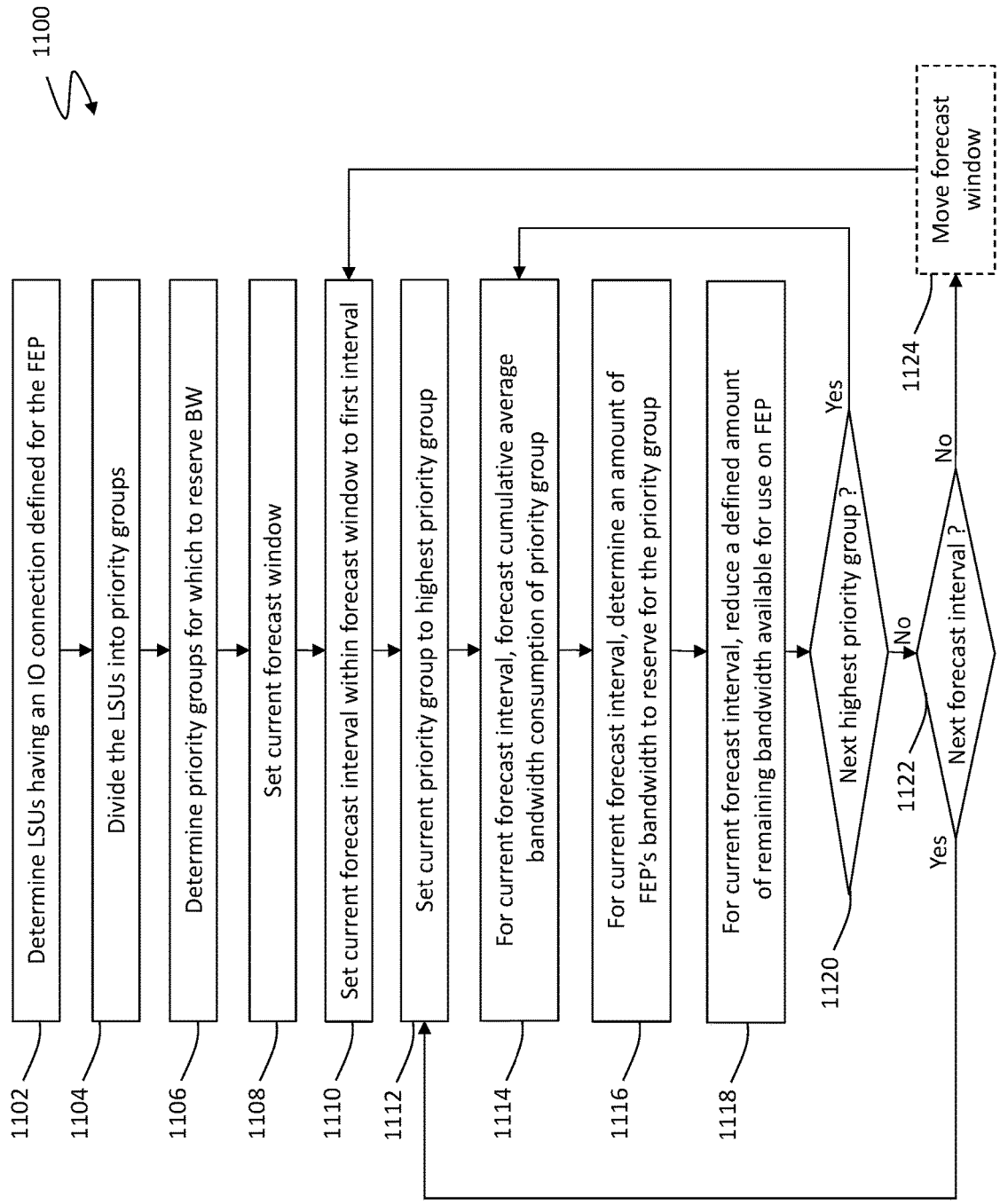
FIG. 11 is a flow chart illustrating an example of a method of establishing reserve amounts of bandwidth and remaining bandwidth for a front-end port based on forecasted bandwidth consumption, according to embodiments of the invention.

FIG. 11 is a flow chart illustrating an example of a method 1100 of establishing reserve amounts of bandwidth and remaining bandwidth for a FEP based on forecasted bandwidth consumption, according to embodiments of the invention. Other embodiments of a method of managing bandwidth of IO connections of an FEP based on forecasted bandwidth consumption, for example, variations of the method 1100, are possible and are intended to fall within the scope of the invention. The method 1100 may be implemented by the bandwidth management logic 752.

In a step 1102, LSUs having an IO connection defined for the FEP may be determined, for example, by reference to the data structure 800 (e.g., the masking table 754). In a step 1104, the LSUs determined in the step 1102 may be divided into priority groups, for example, in accordance with service level objectives or other performance objectives defined for the LSU. For example, the LSU may be one of a plurality of LSUs defined as a member of an SG, for example, in an SG data structure. The SG data structure may include a plurality of entries, each entry representing an SG. Each entry may specify, among other information, a list of all LSUs included in the SG, a host application associated with the SG, and a service level objective (e.g., SLO) specified for the SG. The SLO may be one of a plurality of SLOs defined for the storage system, where each of the SLOs specifies one or more performance objectives, for example, average response time. For example, in embodiments in which the storage system is a PowerMax storage system, the SLOs may include (in order of priority from highest to lowest): Diamond, Platinum, Gold, Silver and Bronze, and perhaps other SLOs.

The priority groups (PGs) into which LSUs are grouped in the step 1104 may correspond to SLOs of the SGs to which the LSUs belong. There may be a one-to-one correspondence between a priority group and an SG, or there may be a one-to-many relationship. For example, in some embodiments, a highest priority group may correspond to a highest SLO (e.g., Diamond), and a second (and lowest) priority group may correspond to all non-highest level SLOs (e.g., Platinum, Gold, Silver, Bronze, etc.). In other embodiments, a highest priority group may correspond to a highest SLO (e.g., Diamond), a second priority group may correspond to a second-highest level SLO (e.g., Platinum); and a third priority group may correspond to all remaining SLOs (e.g., Gold, Silver, Bronze, etc.). In yet other embodiments, a highest priority group may correspond to two or more highest-level SLOs (e.g., Diamond and Platinum) and each of one or more lower-level priority groups may correspond to one or more lower-level SLOs.

In a step 1106, the priority groups for which to reserve bandwidth may be determined. For examine, it may be determined that bandwidth will be reserved only for a highest priority group, or only for the two highest or three highest priority groups or more, or perhaps for all priority groups.

In a step 1108, a current forecast window is set. The forecast window is the window of time over which consumption will be forecasted, e.g., a day, a week, a month, a quarter or a year. The forecast window may include a plurality of temporal intervals, which may be referred to herein as "forecast intervals", for which bandwidth consumption will be forecasted, e.g., hours, days, weeks or months. For example, the forecast window may be defined as a month and the forecast interval may be defined as days. It should be appreciated that a smaller forecast interval produces greater precision of bandwidth management, which may result in greater reduction in congestion and latency and thus better performance. However, smaller forecast intervals also result in greater use of compute and memory resources. A user (e.g., customer, storage administrator, host administrator, network administrator, etc.) may weigh these pros and cons associated with forecast interval size when defining the forecast interval duration. In a step 1110, a current forecast interval may be set to a first forecast interval within the forecast window, e.g., a first day of a month. An execution loop defined by steps 1112-1122 then may be performed for each forecast interval within the forecast window, e.g., each day of the month.

In a step 1112, the current priority group may be set to the highest priority group determined in the step 1106. In a step 1114, for the current forecast interval, the cumulative average bandwidth consumption of the priority group may be determined. That is, the cumulative average bandwidth consumption (i.e., throughput) on the FEP for all IO connections corresponding to the priority group (e.g., corresponding to the LSUs and applications of the SGs corresponding to the priority group) during the forecast interval may be determined. The step 1114 may include accessing historical information that has been collected independent of the method 1100, for example, for various forms of performance analysis and forecasting. Such information may include bandwidth consumption information and/or other information from which future bandwidth consumption may be forecasted. From this historical information, information concerning IO connections including the FEP for which the method 1100 is being performed may be accessed. Any of a variety of forecasting technologies may be employed including, for example, autoregressive integrated moving average (ARIMA) modeling, exponential smoothing, machine learning (e.g., neural networks), other forecasting technology, or any suitable combination of the foregoing. For example, it may be determined that, on the first day of the month being forecasted, a highest priority group (e.g., corresponding to SGs having a Diamond service level) will have a cumulative average bandwidth consumption of 1.8 GB/s (Gigabytes per second).

In a step 1116, for the current forecast interval, an amount of FEP to reserve for the current priority group may be determined, e.g., based on the cumulative average bandwidth consumption determined in the step 1114. For example, a factor may be applied to cumulative average bandwidth consumption determined in the step 1114. The factor used may be based on statistical data and/or other empirical knowledge about the likely variation, dispersion or deviation of cumulative bandwidth consumption over time within a temporal interval in relation to a cumulative average bandwidth consumption during the temporal interval. The factor selected may be selected to produce a reserve amount of bandwidth for the current priority group sufficient to satisfy (at least within a certain tolerance) performance objectives associated with the IO connections of the priority group (e.g., performances objectives defined by SLOs of the SGs corresponding to the priority group), taking into consideration an expected deviation of the cumulative bandwidth consumption from the cumulative average bandwidth consumption during a forecasted interval. For example, the factor used may be 1.2 such that the amount of bandwidth reserved for the current priority group for the current forecast interval in the step 1116 is 120% of the cumulative average bandwidth consumption determined in the step 114. For example, if the cumulative average bandwidth consumption determined in the step 1116 is 1.8 GB/s, the reserve amount determined in the step 1116 may be 1.2×1.8 GB/s=2.16 GB/s. Other factors may be used.

In a step 1118, the amount of available bandwidth on the FEP to be shared among IO connections during the current forecast interval may be reduced by an amount equal to the reserve amount determined for the current priority group for the current forecast interval in the step 1116. For example, a bandwidth consumption (i.e., throughput) capacity of the FEP may have been previously determined. On a first pass through the step 1118 for the current forecast interval—i.e., for the highest priority group—the amount of available bandwidth on the FEP may be the throughput capacity of the FEP. The reserve amount determined in the step 1116 may be subtracted from the current amount of bandwidth (e.g., the throughput capacity of the FEP during a first pass). For example, if the throughput capacity of the FEP is 16 GB/s, and the reserve amount determined in the step 1116 is 2.16 GB/s, then the remaining bandwidth determined in the step 1118 may be 16 GB/s−2.16 GB/s=13.84 GB/s. That is, during the current forecasted interval, 13.84 GB/s of bandwidth may be shared by, and competed for, by the IO connections on the FEP. It should be appreciated that, although a certain amount of bandwidth may be reserved for priority groups to which certain IO connection belong (e.g., per the step 1116) during a forecast interval, these certain IO connections still may compete for the remaining bandwidth as well.

In a step 1120, it may be determined whether there is a next highest priority group for which bandwidth on the FEP is to be reserved. If so, the steps 1114, 1116 and 1118 may be repeated for the next highest priority group. For example, it may be determined in the step 1114 that the cumulative average bandwidth consumption of the next highest priority group during the current forecast interval is 1.3 GB, and in the step 1116 the factor of 1.2 may be applied to determine a reserve amount of bandwidth of 1.56 GB/s; and, in the step 1118, the reserve amount of 1.56 may be subtracted from the remaining bandwidth amount for the FEP during the current forecast interval (i.e., resulting from the last pass through step 1118 for the current forecast interval) to produce the reduced amount of available bandwidth, e.g., 13.84 GB/s− 1.56 GB/s=12.28 GB/s.

It should be appreciated that the factor applied in the step 1116 may be different for different priority groups. For example, higher priority groups may have a larger factor applied than lower priority groups in recognition that meeting bandwidth requirements of higher priority applications (associated with higher priority groups) is more important (in some cases critical) than meeting bandwidth requirement of lower priority applications (associated with higher priority groups). In some cases, it is possible that, for a forecast interval, depending on the throughput capacity of the FEP, the number of priority groups for which bandwidth is reserved and the determined cumulative average bandwidth consumption, there is not enough bandwidth available to satisfy the cumulative reserve amounts determined in the step 1116 for all of the priority groups. In some embodiments, the reserve bandwidth for priority group for a forecast interval may be capitated at a certain amount, for example, 50% of whatever FEP bandwidth is still available when the step 1116 is executed. In this manner, the amount of FEP bandwidth reserved for priority groups during a forecast interval would never exceed the throughput of the FEP. Other techniques may be applied to prevent the FEP throughput being exceeded, and in some cases other adjustments (manual and/or automatic) may be made to accommodate performance needs of IO connections.

If in the step 1120 it is determined that there is not a next highest priority group, then in the step 1122 it may be determined whether there is a next forecast interval within the current forecast window; e.g., a next day within the month. If there is a next forecast interval, the method 1100 may return to the step 1112, and steps 1112-1120 may be performed for the next forecast interval. If it is determined on the step 1122 that there is not a next forecast interval, then the method 1100 may end, and may be performed again at a later time, e.g., at a scheduled time or in response to an event (e.g., user input) for a new forecast window. In some embodiments, if it is determined in the step 1122 that there is not a next forecast interval, then the forecast window may be moved in a step 1124, and the steps 1110-1122 performed for the new forecast window. The new forecast window resulting from the step 1124 or when the method 1100 is performed at a later time may overlap with the previous forecast window such that the steps 1112-1122 are performed for some of the same forecast intervals for which they were performed for one or more previous forecast windows. In such cases, the values determined in the steps 1114-1118 may be adjusted (e.g., using known forecasting techniques) or replaced with newly calculated value, which may take into account updated historical information.

Figure 12:
FIGS. 12 and 13 are block diagrams illustrating examples of data structures for managing bandwidth of IO connections according to priority groups, according to embodiments of the invention.
Figure 13:

The information accessed and generated in the steps 1114, 1116 and 1118 may be stored in any a variety of data structures, including one or more data structures described herein, including data structures 1200 and 1300 described in relation to FIGS. 12 and 13. FIGS. 12 and 13 are block diagrams illustrating examples of data structures 1200, 1300 for managing bandwidth of IO connections according to priority groups, according to embodiments of the invention. Other embodiments of data structures for managing bandwidth of IO connections according to priority group, for example, variations of the data structures 1200, 1300, are possible and are intended to fall within the scope of the invention.

The data structure 1200 may represent the cumulative average bandwidth consumption of a plurality (e.g., all) of the priority groups on an FEP for a plurality of forecast intervals (e.g., forecast intervals of a forecast window). The data structure (e.g., table) 1200 may include a plurality of entries 1210, each entry representing a forecast interval identified in a column 1202. Each entry 1210 may specify, in each of columns 1204-1208, a cumulative average consumed bandwidth for the priority group represented by the column for the forecast interval, as well as other information. The values in columns 1204-1208 may have been generated, or obtained from historical information, during performance of the step 1114 of the method 1100. A data structure other than the table illustrated in FIG. 12, for example, a linked list and/or object-oriented data structure, may be used to record the same information.

The data structure 1300 may store a variety of bandwidth management information for an FEP. The data structure may include a header 1302 and a plurality of entries 1310. The header 1302 may include and ID 1304 of the FEP and the BWT (i.e., bandwidth threshold or maximum throughput) 1306 of the FEP and other information relating to managing bandwidth consumption on the FEP. Each entry may represent a forecast interval identified in a column 1312. Each entry 1310 may specify, in each of columns 1314-1318, a reserve amount of bandwidth for the priority group represented by the column for the forecast interval, which values may have been generated according to the step 1116 of the method 1100. Each entry 1310 also may specify, in columns 1320, a remaining bandwidth to be shared, and competed for, by the IO connections on the FEP during the forecast interval, which value may have been generated according to the step 1118 of the method 1100; and each entry also may specify other information relevant to managing bandwidth consumption for the forecast interval represented by the entry. The information stored in the data structure 1300 may be used to manage bandwidth consumption on the FEP specified by the FEP ID 1304, for example, during performance of the method 1400.

Figure 14:
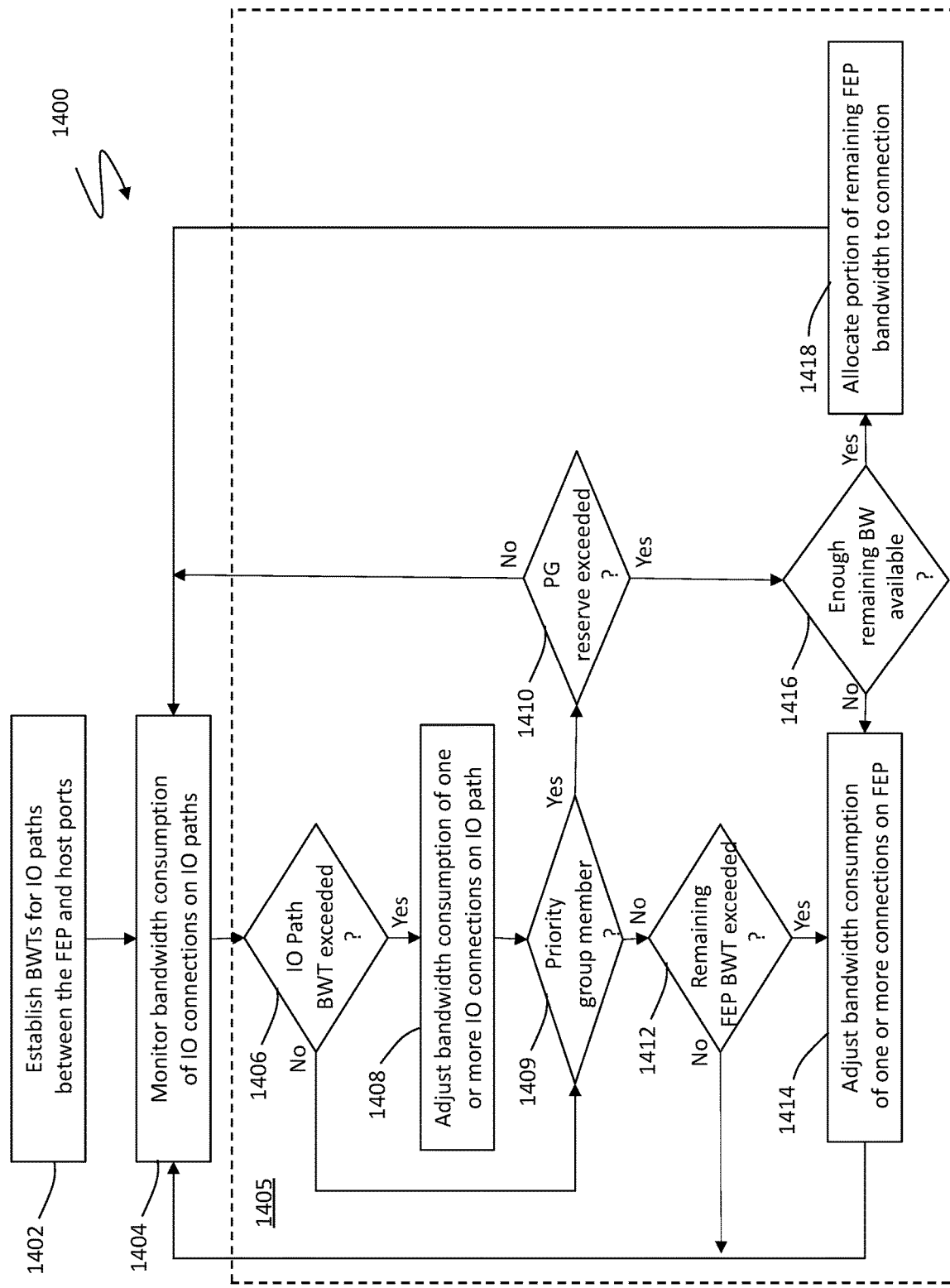
FIG. 14 is a flow chart illustrating an example of a method of managing bandwidth for a front-end port, according to embodiments of the invention.

FIG. 14 is a flow chart illustrating an example of a method 1400 of managing bandwidth for an FEP, according to embodiments of the invention. Other embodiments of a method of managing bandwidth for an FEP, for example, variations of the method 1400, are possible and are intended to fall within the scope of the invention. The method 1400 may be implemented by the bandwidth management logic 752.

In a step 1402, for a plurality (e.g., all) TO paths between the FEP and respective host ports of host systems communicatively coupled (e.g., via one or more switches) to the FEP, BWTs may be established. The plurality of TO paths may be determined, for example, by accessing data structures 800 and/or 900 described in relation to FIGS. 8 and 9. In some embodiments, for each TO path, the step 1402 may include interrogating the one or more switches between the FEP and host port of the TO path and determining, for the two or more communication links between the FEP and host port, a maximum transmission rate (i.e., bandwidth) negotiated (e.g., between a switch and another switch, host port or FEP) for the communication link. These transmission rates may be determined, for example, by the FEP issuing certain commands to the switch(es) to which the FEP is connected that specify an identifier of the host port in question, for example, after the host port has logged into the FEP and/or the host system in question had registered with the storage system of the FEP, as described in more detail elsewhere herein.

For example, referring to the storage network 700 described in relation to FIG. 7, the FEP 744*b* may issue a Get Fabric Port Name (GFPN) command to the SSP 720*e* in accordance with a Fibre Channel (FC) protocol. The GFPN command may specify an identifier of the host port 712*a* (e.g., its word-wide name (WWN)), resulting in the fabric port (i.e., SHP) 720*a* that is physically linked to the host port 712*a* being identified, and this identity being returned to the FEP 744*b* from the SSP 720*e* in an FC ACC (accept) communication. The FEP 744*b* then may issue a Get Port Speed Capacity (GPSC) command specifying the returned fabric port ID to learn the maximum transmission rate (i.e., bandwidth) of the communication link between the host port 712*a* and the fabric port 720*a*, which itself may be based on the lower of the bandwidth capacity of the host port 712a and the bandwidth capacity of the fabric port 720a. This maximum bandwidth of the communication link may be communicated to the FEP 744b by the SSP 720e in a FC command. This process may be repeated for any physical links between switches along the IO path between the FEP and host port. The lowest maximum bandwidth may be determined from among the maximum bandwidth of transmission links determined from the foregoing process and the maximum bandwidth (i.e., bandwidth capacity) of the FEP itself. This lowest maximum bandwidth may serve as the established BWT for the IO path.

The step 1402 may detect a slow drain condition on an IO path between an FEP and a host port in which the host port has a lower maximum bandwidth than the FEP, and address the slow drain condition by selecting the lower maximum bandwidth of the host port as the BWT of the IO path, thereby reducing latency and resulting performance degradation on a storage network. In some embodiments of the invention, establishing the BWT of an IO path between an FEP and a host port may be implemented as described in U.S. patent application Ser. No. 16/374,182, titled "Storage-Based Slow Drain Detection and Automated Resolution", by Scott Rowlands et al., filed Apr. 3, 2019, the entire contents of which are hereby incorporated by reference.

The BWTs determined for IO paths in the step 1402 may be stored in one or more data structures, including one or more of the data structures described herein. For example, for each IO connection, the determined BWT may be stored in column 1008 of the entry 1010 of data structure 1000 that represents the IO connection.

In a step 1404, for the one or more IO connections over IO paths that include the FEP, the bandwidth consumption of each IO connection may be monitored, which may include tracking the amount of bandwidth consumed, or queued to be consumed, on each IO connection during a temporal interval. It should be appreciated that the duration of temporal intervals for which bandwidth consumption is monitored ("monitored intervals") may be different than the temporal intervals for which bandwidth consumption is forecasted and for which BWTs are defined for FEPs ("forecast intervals"). For example, while FEP BWT 1306 may be defined for a one-day forecast interval, the monitor interval may be much less, on the order of minutes, seconds or even less. The determined bandwidth consumption information for IO paths for monitored intervals may be stored in one or more data structures, including one or more of the data structures described herein. For example, for each IO connection, the bandwidth consumption information for a current monitored interval may be stored in column 1009 of the entry 1010 of the data structure 1000 that represents the IO connection.

In addition to tracking the amount of bandwidth consumed, or queued to be consumed, on each IO connection during a monitor interval, the step 1404 also may track: a cumulative amount of bandwidth consumed, or queued to be consumed, on an FEP (e.g., for all IO connections on the FEP) during a monitor interval, and store such amount in a data structure 1500; and/or a cumulative amount of bandwidth consumed, or queued to be consumed, for a priority group on an FEP (e.g., for all IO connections corresponding to a priority group on the FEP) during a monitor interval, and store such amount in a data structure 1600.

Figure 15:
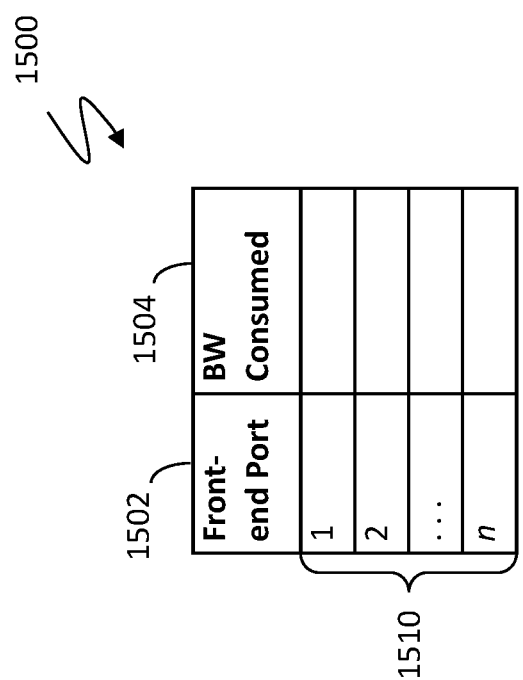

FIG. 15 is a block diagram illustrating an example of a data structure 1500 for tracking bandwidth consumed on FEPs during a temporal interval, according to embodiments of the invention. Other embodiments of a data structure for tracking bandwidth consumed on FEPs during a temporal interval, for example, variations of the data structure 1500, are possible and are intended to fall within the scope of the invention. The data structure may include a plurality of entries, each entry representing an FEP and specifying: an FEP ID in a column 1502; and BW consumed on the FEP during a current monitoring interval in a column 1504.

Figure 16:
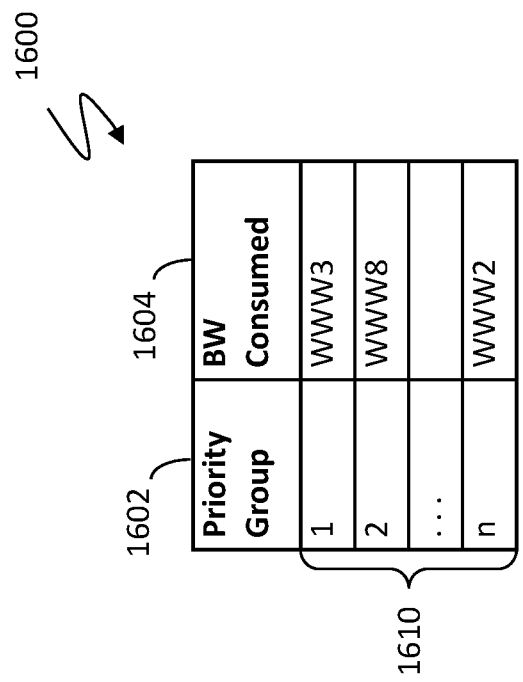
FIGS. 15 and 16 illustrate examples of data structures for managing bandwidth of IO connections, according to embodiments of the invention.

FIG. 16 is a block diagram illustrating an example of a data structure 1600 for tracking bandwidth consumed by a priority group on an FEP during a temporal interval, according to embodiments of the invention. Other embodiments of a data structure for tracking bandwidth consumed by a priority group on an FEP during a temporal interval, for example, variations of the data structure 1600, are possible and are intended to fall within the scope of the invention. The data structure may include a plurality of entries, each entry representing a priority group on the FEP and specifying: a priority group ID in a column 1602; and BW consumed by the priority group on the FEP during a current monitoring interval in a column 1604.

Returning to method 1400, a step 1405 may be performed for each IO connection monitored in the step 1404. While steps 1404 and 1405 are shown in FIG. 14 as being performed serially for illustrative purposes, these steps may be performed concurrently, at least in part. The step 1405 may include, for each IO connection for which it is performed, performance of steps 1406-1418.

In a step 1406, it may be determined whether the BWT established for the IO path over which the IO connection is defined has been exceeded or will be exceeded by the amount of bandwidth queued for transmission on the IO path. This information may be determined, for example, by accessing column 1008 in data structure 1000 for the IO connection and/or from examination of IO operations queued for transmission on the IO path, and/or perhaps by other means. If it is determined in the step 1406 that the BWT has been exceeded or will soon be exceeded (e.g., by queued IO operations), then in a step 1408 the bandwidth consumption for one or more IO connections on the IO path may be adjusted. Such adjustments may include the increase or decrease of the bandwidth consumption for one or more IO connections for a current monitoring interval and/or future monitoring intervals based on any of a variety of factors, including, for example, the SLO associated with each IO connection, current and forecasted traffic on the IO path, other IO paths, other host ports and/or other FEPs, scheduled events, etc.

Steps 1406 and 1408 may be performed to detect and address potential slow drain issues on an IO path.

If it determined in the step 1406 that the BWT has not been exceeded or will soon be exceeded (e.g., by queued IO operations), or after performance of the step 1408, a step 1409 may be performed. In the step 1409 it may be determined whether the IO connection corresponds to a priority group for which bandwidth is being reserved on the FEP, for example, by examination of one of the data structures described herein. If so, then the method 1400 may proceed to a step 1410, which may determine whether the bandwidth reserved for the priority group for the current forecast period has been exceeded or will be exceeded by queued IO operation on the FEP for the priority group. The step 1410 may include accessing the value in column 1604 of the entry 1610 of the data structure 1600 representing the priority group, accessing the value in the appropriate one of columns 1314-1318 representing the reserved amount of bandwidth for the priority group, in the entry 1310 representing the current forecast period, and comparing the two accessed values.

If it is determined in the step 1416 that the bandwidth reserved for the priority group for the current forecast period has not been exceeded and/or will not be exceeded by queued IO operation on the FEP for the priority group, then method 1400 may return to a step 1404. Otherwise, the method 1400 may proceed to a step 1416 where it may be determined whether there is enough of the remaining BW of the FET shared between the IO connections available for the bandwidth needed for the IO connection, for example, by accessing the value in column 1320 of the entry 1310 representing the current forecast interval in data structure 1310.

If there is enough remaining BW available, then a portion of the remaining FEP bandwidth may be allocated to the IO connection for the current monitor interval and/or future monitor intervals in a step 1418, after which the method 1418 may return to a step 1404.

If it is determined in the step 1416 that there is not enough remaining BW available, then the BW consumption of one or more connections on the FEP may be adjusted for the current monitor period and/or future monitor intervals in a step 1414. Such adjustments may include the increase or decrease of the bandwidth consumption for one or more IO connections for a current monitoring interval and/or future monitoring intervals based on any of a variety of factors, including, for example, the SLO associated with each IO connection, current and forecasted traffic on the IO path, other IO paths, other host ports and/or other FEPs, scheduled events, etc.

If it determined in the step 1409 that the IO connection does not correspond to a priority group for which bandwidth is being reserved on the FEP, then, in a step 1412, it may be determined whether the BWT for the FEP for the current forecast interval has been exceeded or will be exceeded by queued IO operation(s) on the FEP. The step 1410 may include accessing the value in column 1504 of the entry 1510 representing the FEP in the data structure 1600, accessing the value of FEP BWT 1306 in data structure 1300, and comparing the two accessed values.

If it is determined in the step 1412 that the BWT for the FEP for the current forecast interval has not been exceeded and/or will not be exceeded by queued IO operation(s) on the FEP, the method 1400 may return to the step 1404. Otherwise the method 1400 may proceed to the step 1414.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100 and 1400, or parts thereof, may be implemented using one or more of the systems and/or data structures described in relation to FIGS. 1-10, 12, 13, 15 and 16 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system including a first port communicatively coupled to one or more host ports, and including a plurality of logical storage units for which IO connections have been established between the first port and the one or more host ports, a method comprising:
   dividing the plurality of logical storage units into a plurality of priority groups, the priority groups ordered according to a predefined priority;
   for a first priority group of the plurality of priority groups having a highest priority, determining a first forecasted cumulative average amount of bandwidth of the first port to be consumed by the logical storage units of the first priority group during a first temporal interval;
   based on the first forecasted average amount, determining a first reserve amount of bandwidth on the first port to be reserved for use by the logical storage units of the first priority group during the first temporal interval; and
   reserving the first reserve amount of bandwidth on the first port for use by the logical storage units of the first priority group during the first temporal interval.

2. The method of claim 1, wherein the first port has a first bandwidth threshold defining a maximum amount of bandwidth permitted to be consumed during any time interval on the first port, and wherein the method further comprises:
   determining a first remaining amount of bandwidth available for use on the first port during the first temporal interval by subtracting the first reserved amount of bandwidth from the first bandwidth threshold.

3. The method of claim 2, further comprising:
determining a second bandwidth threshold defining a maximum amount of bandwidth permitted to be consumed for an IO path between the first port and a first of the one or more host ports; and
for a first IO connection between the first port and the first host port for a logical storage unit that is not a member of the first priority group, determining a first amount of bandwidth to allocate to the first IO connection based on at least the second bandwidth threshold and the first remaining amount of bandwidth.

4. The method of claim 3, wherein determining the first amount of bandwidth to allocate to the first IO connection includes:
determining a second amount of bandwidth desired to be consumed by the first IO connection during the first temporal interval; and
if the second amount of bandwidth exceeds the second bandwidth threshold or the first remaining amount of bandwidth, adjusting an amount of bandwidth to be consumed by one or more IO connections on the first port during the first temporal interval.

5. The method of claim 2, further comprising:
determining a second bandwidth threshold defining a maximum amount of bandwidth permitted to be consumed for an IO path between the first port and a first of the one or more host ports; and
for a first IO connection between the first port and the first host port for a logical storage unit that is a member of the first priority group, determining a first amount of bandwidth to allocate to the first IO connection based on at least the second bandwidth threshold and the first reserve amount of bandwidth.

6. The method of claim 5, wherein determining the first amount of bandwidth to allocate to the first IO connection includes:
determining a second amount of bandwidth desired to be consumed by the first IO connection during the first temporal interval; and
if the second amount of bandwidth exceeds the second bandwidth threshold or the first reserve amount, adjusting an amount of bandwidth to be consumed by the first IO connection during the first temporal interval.

7. The method of claim 1, wherein the method further comprises:
for a second priority group of the plurality of priority groups having a priority lower than the first priority group, determining a second forecasted average amount of bandwidth of the first port to be consumed by the logical storage units of the second priority group during the first temporal interval;
based on the second forecasted average amount, determining a second reserve amount of bandwidth on the first port to be reserved from the first remaining amount of bandwidth for use by the logical storage units of the second priority group during the first temporal interval; and
reserving the second reserve amount of bandwidth on the first port for use by the logical storage units of the second priority group during the first temporal interval.

8. A storage system, comprising:
a first port communicatively coupled to one or more host ports;
a plurality of logical storage units for which IO connections have been established between the first port and the one or more host ports; and
executable logic that implements a method including:
dividing the plurality of logical storage units into a plurality of priority groups, the priority groups ordered according to a predefined priority;
for a first priority group of the plurality of priority groups having a highest priority, determining a first forecasted cumulative average amount of bandwidth of the first port to be consumed by the logical storage units of the first priority group during a first temporal interval;
based on the first forecasted average amount, determining a first reserve amount of bandwidth on the first port to be reserved for use by the logical storage units of the first priority group during the first temporal interval; and
reserving the first reserve amount of bandwidth on the first port for use by the logical storage units of the first priority group during the first temporal interval.

9. The system of claim 8, wherein the first port has a first bandwidth threshold defining a maximum amount of bandwidth permitted to be consumed during any time interval on the first port, and wherein the method further comprises:
determining a first remaining amount of bandwidth available for use on the first port during the first temporal interval by subtracting the first reserved amount of bandwidth from the first bandwidth threshold.

10. The system of claim 9, wherein the method further comprises:
determining a second bandwidth threshold defining a maximum amount of bandwidth permitted to be consumed for an IO path between the first port and a first of the one or more host ports; and
for a first IO connection between the first port and the first host port for a logical storage unit that is not a member of the first priority group, determining a first amount of bandwidth to allocate to the first IO connection based on at least the second bandwidth threshold and the first remaining amount of bandwidth.

11. The system of claim 10, wherein determining the first amount of bandwidth to allocate to the first IO connection includes:
determining a second amount of bandwidth desired to be consumed by the first IO connection during the first temporal interval; and
if the second amount of bandwidth exceeds the second bandwidth threshold or the first remaining amount of bandwidth, adjusting an amount of bandwidth to be consumed by one or more IO connections on the first port during the first temporal interval.

12. The system of claim 9, wherein the method further comprises:
determining a second bandwidth threshold defining a maximum amount of bandwidth permitted to be consumed for an IO path between the first port and a first of the one or more host ports; and
for a first IO connection between the first port and the first host port for a logical storage unit that is a member of the first priority group, determining a first amount of bandwidth to allocate to the first IO connection based on at least the second bandwidth threshold and the first reserve amount of bandwidth.

13. The system of claim 12, wherein determining the first amount of bandwidth to allocate to the first IO connection includes:
determining a second amount of bandwidth desired to be consumed by the first IO connection during the first temporal interval; and
if the second amount of bandwidth exceeds the second bandwidth threshold or the first reserve amount, adjusting an amount of bandwidth to be consumed by the first IO connection during the first temporal interval.

14. The system of claim 8, wherein the method further comprises:
- for a second priority group of the plurality of priority groups having a priority lower than the first priority group, determining a second forecasted average amount of bandwidth of the first port to be consumed by the logical storage units of the second priority group during the first temporal interval;
- based on the second forecasted average amount, determining a second reserve amount of bandwidth on the first port to be reserved from the first remaining amount of bandwidth for use by the logical storage units of the second priority group during the first temporal interval; and
- reserving the second reserve amount of bandwidth on the first port for use by the logical storage units of the second priority group during the first temporal interval.

15. For a storage system including a first port communicatively coupled to one or more host ports, and including a plurality of logical storage units for which IO connections have been established between the first port and the one or more host ports, non-transitory computer-readable media having software stored thereon comprising:
- executable code that divides the plurality of logical storage units into a plurality of priority groups, the priority groups ordered according to a predefined priority;
- executable code that, for a first priority group of the plurality of priority groups having a highest priority, determines a first forecasted cumulative average amount of bandwidth of the first port to be consumed by the logical storage units of the first priority group during a first temporal interval;
- executable code that, based on the first forecasted average amount, determines a first reserve amount of bandwidth on the first port to be reserved for use by the logical storage units of the first priority group during the first temporal interval; and
- executable code that reserves the first reserve amount of bandwidth on the first port for use by the logical storage units of the first priority group during the first temporal interval.

16. The non-transitory computer-readable media of claim 15, wherein the first port has a first bandwidth threshold defining a maximum amount of bandwidth permitted to be consumed during any time interval on the first port, and wherein the software further comprises:
- executable code that determines a first remaining amount of bandwidth available for use on the first port during the first temporal interval by subtracting the first reserved amount of bandwidth from the first bandwidth threshold.

17. The non-transitory computer-readable media of claim 16, wherein the software further comprises:
- executable code that determines a second bandwidth threshold defining a maximum amount of bandwidth permitted to be consumed for an IO path between the first port and a first of the one or more host ports; and
- executable code that, for a first IO connection between the first port and the first host port for a logical storage unit that is not a member of the first priority group, determines a first amount of bandwidth to allocate to the first IO connection based on at least the second bandwidth threshold and the first remaining amount of bandwidth.

18. The non-transitory computer-readable media of claim 17, wherein determining the first amount of bandwidth to allocate to the first IO connection includes:
- determining a second amount of bandwidth desired to be consumed by the first IO connection during the first temporal interval; and
- if the second amount of bandwidth exceeds the second bandwidth threshold or the first remaining amount of bandwidth, adjusting an amount of bandwidth to be consumed by one or more IO connections on the first port during the first temporal interval.

19. The non-transitory computer-readable media of claim 16, wherein the software further comprises:
- executable code that determines a second bandwidth threshold defining a maximum amount of bandwidth permitted to be consumed for an IO path between the first port and a first of the one or more host ports; and
- executable code that, for a first IO connection between the first port and the first host port for a logical storage unit that is a member of the first priority group, determines a first amount of bandwidth to allocate to the first IO connection based on at least the second bandwidth threshold and the first reserve amount of bandwidth.

20. The non-transitory computer-readable media of claim 19, wherein determining the first amount of bandwidth to allocate to the first IO connection includes:
- determining a second amount of bandwidth desired to be consumed by the first IO connection during the first temporal interval; and
- if the second amount of bandwidth exceeds the second bandwidth threshold or the first reserve amount, adjusting an amount of bandwidth to be consumed by the first IO connection during the first temporal interval.

* * * * *